United States Patent
Zhao et al.

(10) Patent No.: US 10,082,708 B2
(45) Date of Patent: Sep. 25, 2018

(54) LIQUID CRYSTAL PANELS AND LIQUID CRYSTAL DEVICES

(71) Applicant: Shenzhen China Star Optoelectronics Technology Co., Ltd., Shenzhen, Guangdong (CN)

(72) Inventors: Li Zhao, Guangdong (CN); Bangyin Peng, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 185 days.

(21) Appl. No.: 15/102,867

(22) PCT Filed: May 16, 2016

(86) PCT No.: PCT/CN2016/082190
§ 371 (c)(1),
(2) Date: Jun. 8, 2016

(87) PCT Pub. No.: WO2017/185423
PCT Pub. Date: Nov. 2, 2017

(65) Prior Publication Data
US 2018/0081244 A1    Mar. 22, 2018

(30) Foreign Application Priority Data
Apr. 28, 2016 (CN) .......................... 2016 1 0272406

(51) Int. Cl.
G02F 1/1343 (2006.01)
G02F 1/1368 (2006.01)
(Continued)

(52) U.S. Cl.
CPC ...... *G02F 1/134309* (2013.01); *G02F 1/1368* (2013.01); *G02F 1/13439* (2013.01);
(Continued)

(58) Field of Classification Search
CPC ................................................ G02F 1/134309
See application file for complete search history.

(56) References Cited

U.S. PATENT DOCUMENTS

2005/0185120 A1* 8/2005 Kitoh ................ G02F 1/133707
349/114
2012/0026439 A1* 2/2012 Jung ................ G02F 1/133753
349/110
(Continued)

FOREIGN PATENT DOCUMENTS

CN        1658031 A     8/2005
CN      101498869 A     8/2009
(Continued)

*Primary Examiner* — Sang V Nguyen
(74) *Attorney, Agent, or Firm* — Andrew C. Cheng

(57) ABSTRACT

The present disclosure discloses a liquid crystal panel and a liquid crystal device. The liquid crystal panel includes a thin film transistor (TFT) substrate and a color filter (CF) substrate opposite to each other. Each of sub-pixel areas of the TFT substrate is configured with a first conductive film, and each of sub-optical-filter areas of the CF substrate is configured with a second conductive film opposite to the first conductive film, the first conductive film and the second conductive film are rectangular. A central point of the first conductive film projects on the central point of the second conductive film. A dimension of the second conductive film is greater than the dimension of the first conductive film, and a ring-shaped conductive film is formed in an area of the first conductive film not covered by the second conductive film.

10 Claims, 8 Drawing Sheets

(51) Int. Cl.
*G02F 1/1335* (2006.01)
*G02F 1/1337* (2006.01)

(52) U.S. Cl.
CPC .. *G02F 1/133514* (2013.01); *G02F 1/133723* (2013.01); *G02F 1/133788* (2013.01); *G02F 2001/134345* (2013.01); *G02F 2201/122* (2013.01)

(56) References Cited

U.S. PATENT DOCUMENTS

| | | | | |
|---|---|---|---|---|
| 2012/0050719 A1* | 3/2012 | Hayama | ............... | G01N 21/95 356/51 |
| 2012/0188498 A1* | 7/2012 | Nishino | ............... | G02F 1/1345 349/143 |
| 2012/0281173 A1* | 11/2012 | Kwon | ............... | G02F 1/133707 349/123 |
| 2014/0253859 A1* | 9/2014 | Yoon | ............... | G02F 1/134336 349/144 |
| 2014/0307214 A1* | 10/2014 | Saitoh | ............... | G02F 1/134363 349/139 |

FOREIGN PATENT DOCUMENTS

| | | |
|---|---|---|
| CN | 102346335 A | 2/2012 |
| CN | 102998854 A | 3/2013 |
| CN | 103874957 A | 6/2014 |
| CN | 104035246 A | 9/2014 |
| JP | 2010049028 A | 3/2010 |

* cited by examiner

LIQUID CRYSTAL PANELS AND LIQUID CRYSTAL DEVICES

CROSS REFERENCE

This application claims the priority of Chinese Patent Application No. 201610272406.4, entitled "Liquid crystal panels and liquid crystal devices", filed on Apr. 28, 2016, the disclosure of which is incorporated herein by reference in its entirety.

FIELD OF THE INVENTION

The present invention relates to liquid crystal manufacturing technology field, and more particularly to a liquid crystal panel and a liquid crystal device (LCD) with the same.

BACKGROUND OF THE INVENTION

Vertical Alignment (VA) mode is characterized by attributes such as wide viewing angle, high contrastness, and the friction alignment is not needed, and thus is a display mode widely adopted by large-scale Thin Film Transistor-Liquid Crystal Display (TFT-LCD). Among a variety of VA display technologies, the liquid crystal panel manufactured by Ultra Violet Induced Multi-Domain Vertical Alignment (UV$^2$A) is characterized by attributes such as high aperture rate, high contrastness, and quick response. UV$^2$A is optical alignment technology adopting Ultra Violet (UV) rays to conduct VA liquid crystal alignment. UV$^2$A configures additive having phototaxis on the alignment film, and adopts linearly polarized UV light to radiate on the alignment film. As such, the alignment film controls the alignment of the liquid crystal molecules so as to control the rotation of the liquid crystal molecules.

Fringing fields may be generated between the top and down substrates of the liquid crystal panel. The fringing field applies the electrical field force toward the liquid crystal molecules between the two substrates so as to affect the rotation of the liquid crystal molecules. Further, due to the orthogonal-vertical-optical-alignment method of UV$^2$A, dark stripes may be formed within the pixel cell in accordance with the change of the alignment direction, such as stripes having the patterns of . Such dark stripes may affect the transmission rate of the liquid crystal panel, and also the brightness of the liquid crystal panel.

SUMMARY OF THE INVENTION

The present disclosure relates to a liquid crystal panel and the display device with the same to reduce the number of the dark stripes so as to enhance the transmission rate of the liquid crystal panel.

In one aspect, a liquid crystal panel includes: a thin film transistor (TFT) substrate and a color filter (CF) substrate opposite to each other, each of sub-pixel areas of the TFT substrate is configured with a first conductive film, each of sub-optical-filter areas of the CF substrate is configured with a second conductive film opposite to the first conductive film, the first conductive film and the second conductive film are rectangular, a central point of the first conductive film projects on the central point of the second conductive film, a dimension of the second conductive film is greater than the dimension of the first conductive film, a ring-shaped conductive film is formed in an area of the first conductive film not covered by the second conductive film, each of edges of the ring-shaped conductive film is configured with a gap, one edge of the gap aligns with one edge of the first conductive film, and the gap is configured to be symmetrical with respect to a middle of the edge of the ring-shaped conductive film.

Wherein the ring-shaped conductive films corresponding to the second conductive film are connected, and the first conductive film and the gaps are arranged in a matrix.

Wherein the first conductive film and the second conductive film are transparent conductive films.

Wherein the first conductive film and the second conductive film are transparent ITO films.

Wherein the TFT substrate and the CF substrate are coated with alignment films made by polymer materials.

Wherein the alignment film is made by polyamide amine.

Wherein the first conductive film and the second conductive film are transparent conductive films.

Wherein the first conductive film and the second conductive film are transparent ITO films.

Wherein the TFT substrate and the CF substrate are coated with alignment films made by polymer materials.

Wherein the alignment film is made by polyamide amine.

In another aspect, a liquid crystal panel includes: a liquid crystal panel, wherein the liquid crystal panel includes a thin film transistor (TFT) substrate and a color filter (CF) substrate opposite to each other, each of sub-pixel areas of the TFT substrate is configured with a first conductive film, each of sub-optical-filter areas of the CF substrate is configured with a second conductive film opposite to the first conductive film, the first conductive film and the second conductive film are rectangular, a central point of the first conductive film projects on the central point of the second conductive film, a dimension of the second conductive film is greater than the dimension of the first conductive film, a ring-shaped conductive film is formed in an area of the first conductive film not covered by the second conductive film, each of edges of the ring-shaped conductive film is configured with a gap, one edge of the gap aligns with one edge of the first conductive film, and the gap is configured to be symmetrical with respect to a middle of the edge of the ring-shaped conductive film.

Wherein the ring-shaped conductive films corresponding to the second conductive film are connected, and the first conductive film and the gaps are arranged in a matrix.

Wherein the first conductive film and the second conductive film are transparent conductive films.

Wherein the first conductive film and the second conductive film are transparent ITO films.

Wherein the TFT substrate and the CF substrate are coated with alignment films made by polymer materials.

Wherein the alignment film is made by polyamide amine.

Wherein the first conductive film and the second conductive film are transparent conductive films.

Wherein the first conductive film and the second conductive film are transparent ITO films.

Wherein the TFT substrate and the CF substrate are coated with alignment films made by polymer materials.

Wherein the alignment film is made by polyamide amine.

In view of the above, by configuring the gaps on each of the edges of the second conductive film on the CF substrate, one edge of the gap aligns with one edge of the first conductive film, and the gap is configured to be symmetrical with respect to a middle of the edge of the ring-shaped conductive film. With such configuration, the location of the gaps 31 avoids the fringing electrical field effect and the dark stripes. Not only the degree of the dark stripes is reduced, but also the transmission rate and the contrastness of the liquid crystal panel is enhanced.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
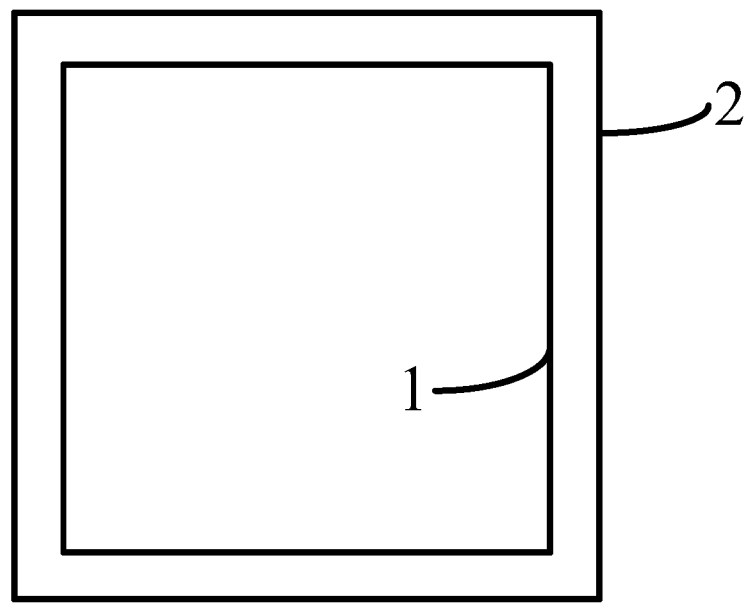
FIG. 1 is a schematic view of the second conductive film and the first conductive film within the sub-pixel areas of one conventional liquid crystal panel.

Liquid crystal panels generally include a thin film transistor (TFT) substrate, a liquid crystal layer, and a color filter (CF) substrate, wherein the TFT substrate is opposite to the CF substrate, and the liquid crystal layer is arranged therebetween. The TFT substrate includes a plurality of sub-pixel areas. The CF substrate includes a plurality of sub-optical-filter areas. Each of the sub-pixel areas on the TFT substrate corresponds to the sub-optical-filter areas on the CF substrate. Each of the sub-pixel areas on the TFT substrate is configured with a first conductive film, and each of the sub-optical-filter areas is configured with a second conductive film, and the first conductive film is configured to be opposite to the second conductive film. FIG. 1 shows one conventional TFT liquid crystal panel (not shown) of VA mode, wherein the dimension of the second conductive film 2 is greater than that of the first conductive film 1.

In order to control the alignment of the liquid crystal molecules, an alignment film (not shown) is uniformly coated on the CF substrate and the TFT substrate. The alignment film is made by polymer, and is obtained after being applied with the alignment process. The alignment film is capable of controlling the alignment of the liquid crystal molecules such that the liquid crystal molecules may be arranged in accordance with a specific direction so as to display the colors. The alignment technologies mainly include friction alignment technology and non-friction alignment technology. The non-friction alignment technology may avoid the abnormal caused by mechanical friction toward the alignment film. With respect to the non-friction alignment technology, $UV^2A$ technology has been widely adopted. Regarding $UV^2A$, the additive having phototaxis is configured on the alignment films on the CF substrate and the TFT substrate. Further, linearly polarized UV light is adopted to radiate the CF substrate and the TFT substrate. The UV rays precisely irradiate on the alignment film at a specific bevel angle. The polymer materials within the alignment film are automatically guided with the precision at pm-level so as to be at the irradiating angle of the UV rays. As such, the liquid crystal molecules are configured to orient along the direction of the UV rays. As stated above, the dimension of the second conductive film on the CF substrate is greater than that of the first conductive film on the TFT substrate. Due to the fringing field effects, the density of the electrical field at the rim of the second conductive film is greater, which results in a stronger electrical field force toward the internal of the second conductive film. Under the electrical field force, the liquid crystal molecules original oriented along with the alignment direction may be crossed or overlapped along the inclination direction, such that the dark stripes may occur within the sub-pixel area of the TFT substrate. Regarding the $UV^2A$ technology, the dark stripes of different shapes may be generated when the irradiating directions of the UV rays are different.

Figure 2A:
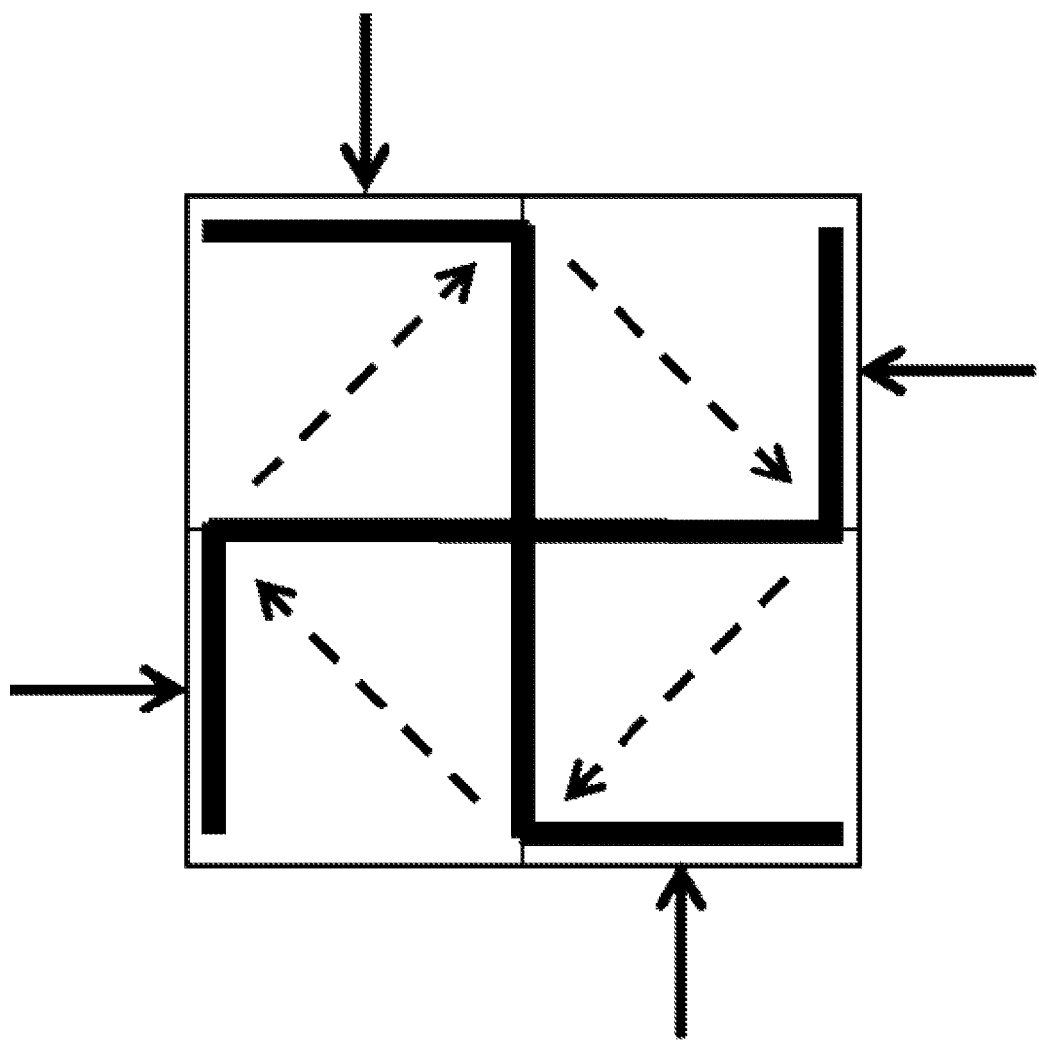
FIGS. 2(a)-(d) are schematic views of the dark stripes within the sub-pixel areas of the conventional TFT substrates.

Specifically, FIGS. 2(a)-2(d) shows the dark stripes of different shapes within the sub-pixel areas of the conventional TFT substrate. In FIG. 2(a), the black frame indicates the sub-pixel area on the TFT substrate, and the solid arrows indicate the direction of the electrical field force, the dashed arrows indicate the rotation directions of the liquid crystal molecules during the $UV^2A$ alignment process. The pattern

relates to one dark stripe. The principle of forming such pattern is described below. When the included angle between the direction of the electrical field force and the rotation direction of the liquid crystal molecules close to the rim of the second conductive film is greater than 90 degrees, the liquid crystal molecules may be crossed or overlapped along the inclination direction, which may result in dark stripes.

Figure 2B:
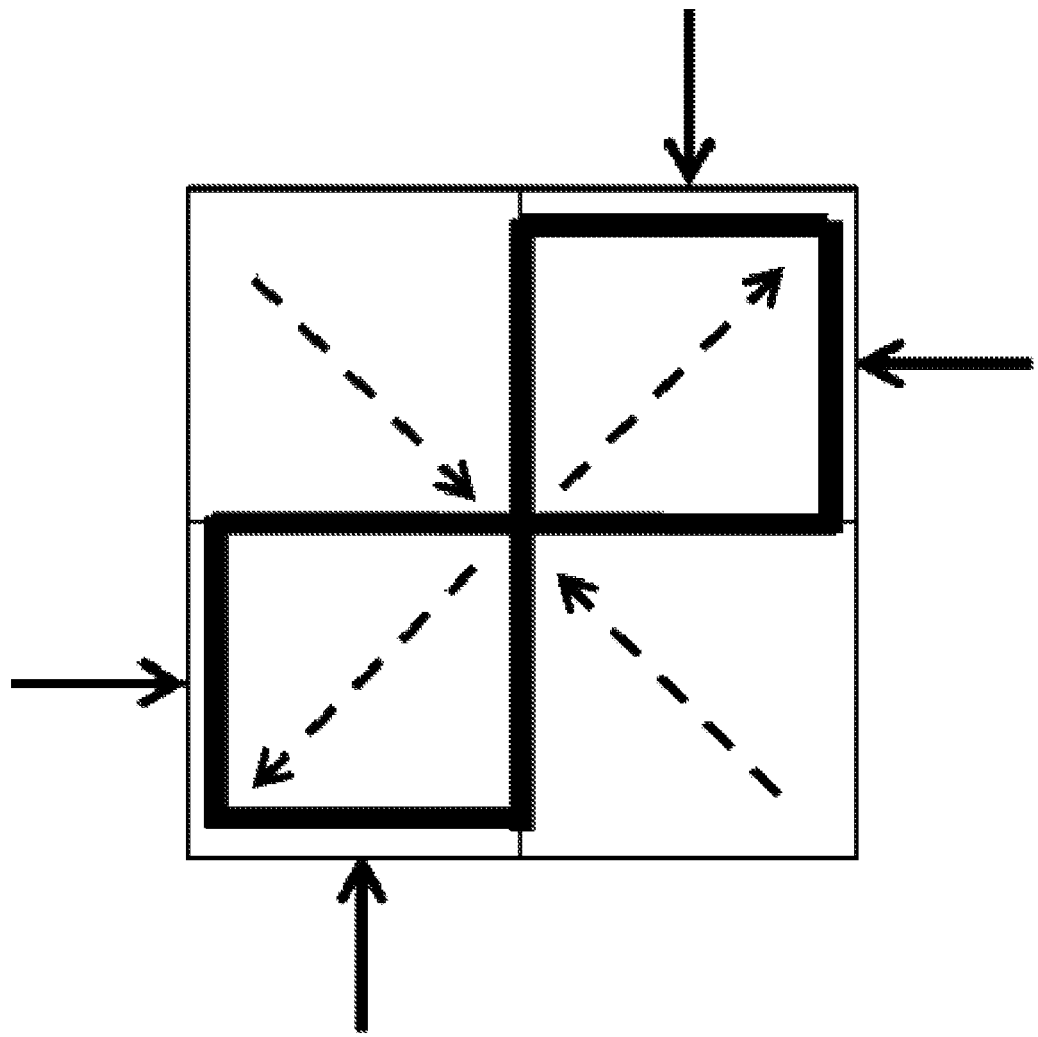
Figure 2C:
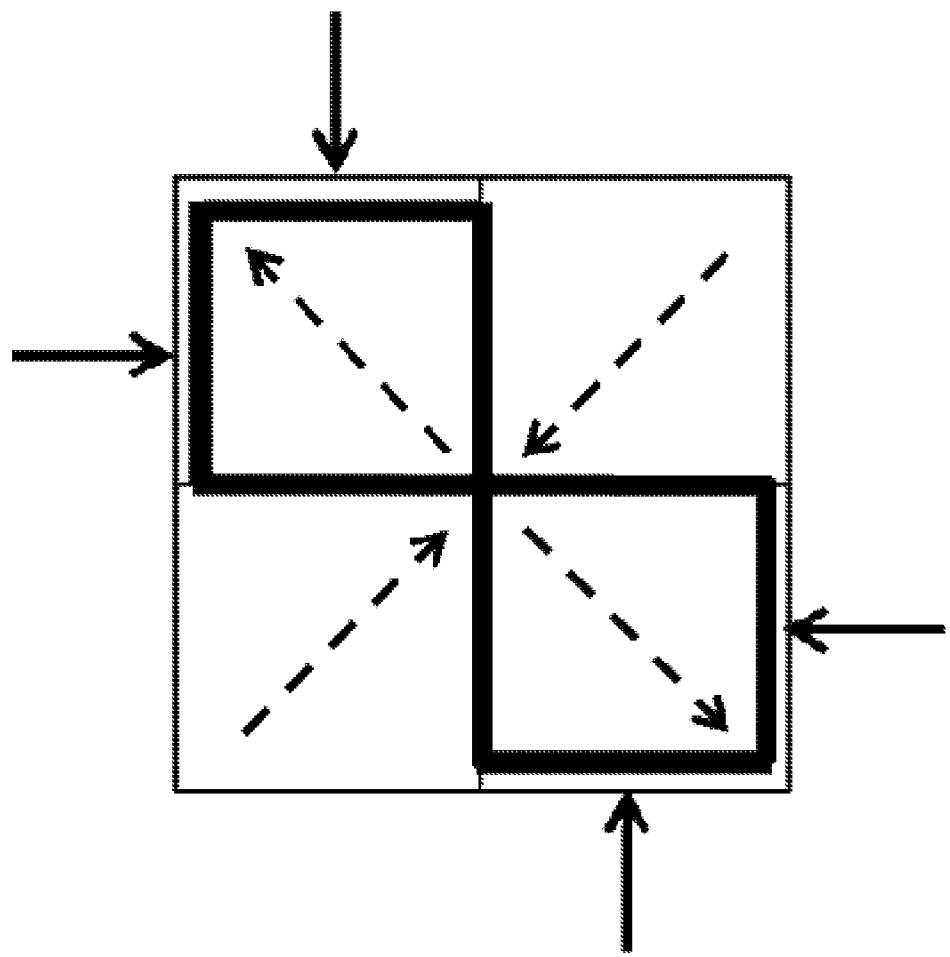
Figure 2D:
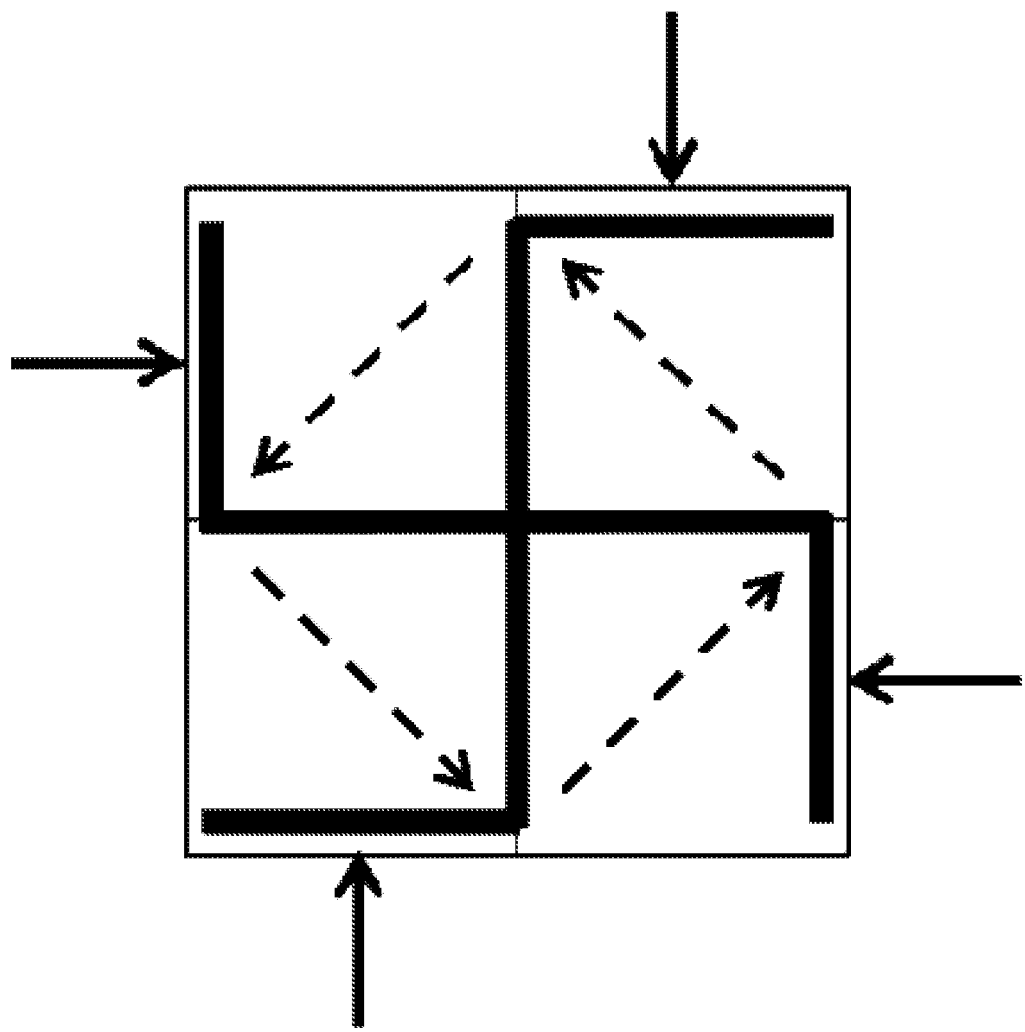

When the included angle between the direction of the electrical field force and the rotation direction of the liquid crystal molecules close to the rim of the second conductive film is smaller than 90 degrees, no dark stripes will be generated. Due to the orthogonal-vertical-optical-alignment method of $UV^2A$, the dark stripe of such pattern " + " may be generated in the middle of the pixel area of the TFT substrate. Similarly, FIG. 2(b) shows the dark stripe of pattern , FIG. 2(c) shows the dark stripe of pattern " ", FIG. 2(d) shows the dark stripe of pattern " ." The dark stripes may reduce the transmission rate of the liquid crystal panel so as to affect the contrastness of the liquid crystal panel.

Figure 3:
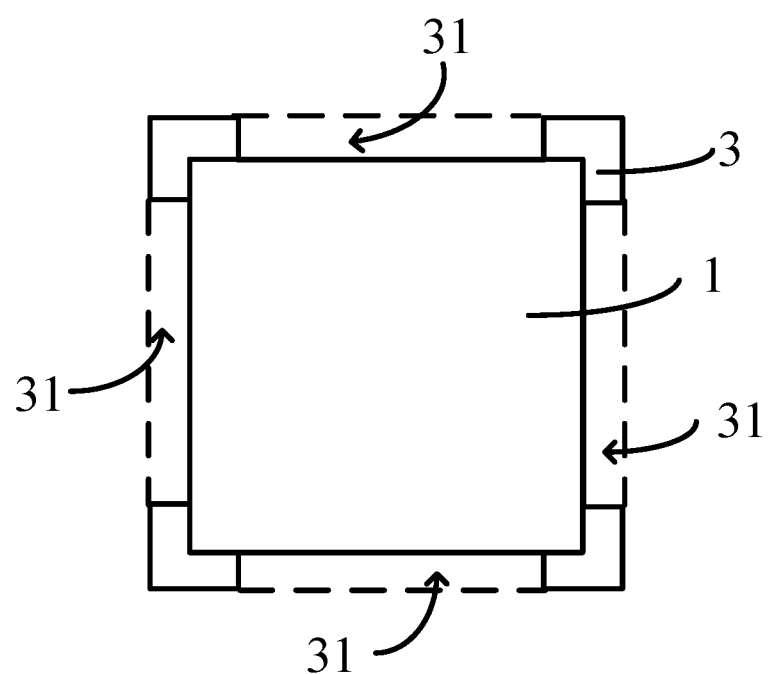
FIG. 3 is a schematic view of the second conductive film and the first conductive film within the sub-pixel areas of the liquid crystal panel in accordance with one embodiment.

As shown in FIG. 3, the liquid crystal panel (not shown) includes a TFT substrate (not shown), a liquid crystal layer (not shown), and a CF substrate (not shown). The TFT substrate includes a plurality of sub-pixel areas. The CF substrate includes a plurality of sub-optical-filter areas. Each of the sub-pixel areas on the TFT substrate corresponds to the sub-optical-filter areas on the CF substrate. Each of the sub-pixel areas on the TFT substrate is configured with the first conductive film 1, and each of the sub-optical-filter areas is configured with the second conductive film 2. The first conductive film 1 is opposite to the second conductive film 3. The first conductive film 1 and the second conductive film 3 are both transparent and planar semiconductor conductive film operating as electrodes for storing the charges. In the embodiment, the first conductive film 1 and the second conductive film 3 are transparent indium tin oxide (ITO) film characterized by attributes such as good conductivity, optical characteristics, chemical stability, and etching uniformity, and appropriate shapes. In other embodiments, the transparent conductive film may be made by other materials.

In the embodiment, the first conductive film 1 and the second conductive film 3 are rectangular, which may be easily manufactured. In other embodiment, the first conductive film 1 and the second conductive film 3 may be configured to be of other shapes. A central point of the second conductive film 2 is overlapped with the projection of the central point of the first conductive film 1 on the CF substrate. That is, the second conductive film 3 and the first conductive film 1 are concentric. The dimension of the second conductive film 3 is greater than the dimension of the first conductive film 1. As the dimension of the second conductive film 3 is greater than the dimension of first conductive film 1, and the second conductive film 3 and the first conductive film 1 are concentric, a ring-shaped conductive film (not shown) is formed. Gaps 31 are configured at four edges of the ring-shaped conductive film. Each of the gaps 31 is configured at a middle of the edge. That is, each of the gaps 31 extends from the middle of the edges and extends to two lateral sides with equal length. The width of each of the gaps 31 is configured as below. Along a width direction, the ring-shaped conductive film is completely cut off such that one edge of the each of the gaps 31 aligns with the edge of the first conductive film 1.

Figure 4:
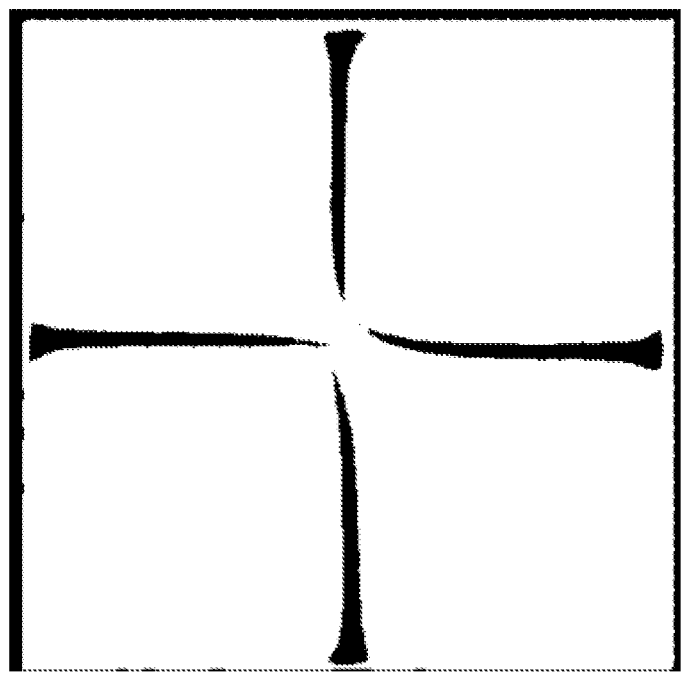
FIG. 4 is a simulation diagram of the second conductive film and the first conductive film within the sub-pixel areas of the liquid crystal panel in accordance with one embodiment.

In the embodiment, the UV$^2$A technology is adopted to conduct the liquid crystal alignment. One alignment film (not shown) is coated on the CF substrate and the TFT substrate. The alignment film is made by polyamide amine. In other embodiments, the alignment film may be made by other polymer materials. Due to the orthogonal-vertical-optical-alignment method of UV$^2$A, dark stripes with "+" shape may be formed in the middle of the sub-pixel area of the TFT substrate, and which cannot be eliminated. However, by configuring the gaps 31 at four edges of the ring-shaped conductive film, the fringing field effect may not be applied to the liquid crystal molecules from the gaps 31 such that the liquid crystal molecules original oriented along with the alignment direction of the UV rays and the liquid crystal molecules may not be crossed or overlapped along the inclination direction, which avoids the dark stripes. FIG. 4 is a simulation diagram of the dark stripes within the sub-pixel areas of the TFT substrate. As shown in FIG. 4, the sub-pixel area includes the dark stripes having "+" shape, but there is no dark stripe in a rim. Thus, the simulation shows that the proposed solution is capable of reducing the dark stripes.

In the embodiment, with respect to the second conductive film 3, it can be understood that the impact caused by the middle portion is greater than that caused by two ends of the edge. Before configuring the gaps 31, the whole edge of the second conductive film 3 applies the electrical field force toward the liquid crystal molecules, which may cause the dark stripes on the edge. However, the dark stripes occurred by two ends of the edge of the second conductive film 3 may be covered by other structure of the liquid crystal panel, and thus may not cause great impact to the overall transmittance. The dark stripes caused by the middle portion of each edges of the second conductive film 3 cannot be covered by other structures, and such dark stripes may greatly affect the overall transmittance. Thus, in the embodiment, the overall transmittance may be greatly enhanced by configuring the gaps 31 in the middle portion of the edge, rather than in other locations.

Figure 5:
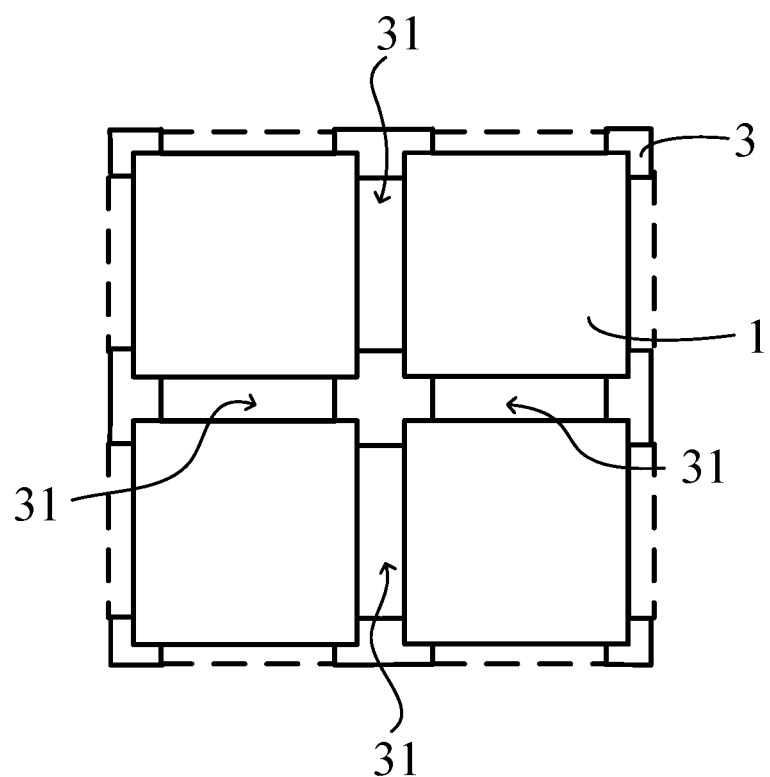
FIG. 5 is a schematic view of the pixel structure showing the matrix formed by the second conductive films and the first conductive films in accordance with one embodiment.

In the embodiment, as shown in FIG. 5, the ring-shaped conductive films corresponding to the second conductive films 3 are connected the first conductive films 1 and the gaps 31 are arranged horizontally and vertically to form a matrix such that electrodes of the pixel structure are connected.

In view of the above, each of the edges of the second conductive film 3 on the CF substrate is configured with the gap 31. Along the length direction, the gap 31 is symmetrical with respect to the middle of the edge of the first conductive film 1, and one edge of the gaps 31 aligns with the edge of the first conductive film 1 along the width direction. With such configuration, the location of the gaps 31 avoids the fringing electrical field effect and the dark stripes. Not only the degree of the dark stripes is reduced, but also the transmission rate and the contrastness of the liquid crystal panel is enhanced.

In one embodiment, a LCD includes the above liquid crystal panel.

Above are embodiments of the present invention, which does not limit the scope of the present invention. Any modifications, equivalent replacements or improvements within the spirit and principles of the embodiment described above should be covered by the protected scope of the invention.

What is claimed is:

1. A liquid crystal panel, comprising:
   a thin film transistor (TFT) substrate and a color filter (CF) substrate opposite to each other, each of sub-pixel areas of the TFT substrate is configured with a first conductive film, each of sub-optical-filter areas of the CF substrate is configured with a second conductive film opposite to the first conductive film, the first conductive film and the second conductive film are rectangular, a central point of the first conductive film projects on the central point of the second conductive film, a dimension of the second conductive film is greater than the dimension of the first conductive film, ring-shaped conductive films are formed in an area of the first conductive film not covered by the second conductive film, each of edges of the ring-shaped conductive films are configured with a gap, one edge of the gap aligns with one edge of the first conductive film, and the gap is configured to be symmetrical with respect to a middle of the edge of the ring-shaped conductive film;
   wherein the ring-shaped conductive films corresponding to the second conductive film are connected with each other, and the first conductive film and the gaps are arranged in a matrix.

2. The liquid crystal panel as claimed in claim 1, wherein the first conductive film and the second conductive film are transparent conductive films.

3. The liquid crystal panel as claimed in claim 2, wherein the first conductive film and the second conductive film are transparent ITO films.

4. The liquid crystal panel as claimed in claim 1, wherein the TFT substrate and the CF substrate are coated with alignment films made by polymer materials.

5. The liquid crystal panel as claimed in claim 4, wherein the alignment film is made by polyamide amine.

6. A liquid crystal device, comprising:

a liquid crystal panel, wherein the liquid crystal panel comprises a thin film transistor (TFT) substrate and a color filter (CF) substrate opposite to each other, each of sub-pixel areas of the TFT substrate is configured with a first conductive film, each of sub-optical-filter areas of the CF substrate is configured with a second conductive film opposite to the first conductive film, the first conductive film and the second conductive film are rectangular, a central point of the first conductive film projects on the central point of the second conductive film, a dimension of the second conductive film is greater than the dimension of the first conductive film, ring-shaped conductive films are formed in an area of the first conductive film not covered by the second conductive film, each of edges of the ring-shaped conductive films are configured with a gap, one edge of the gap aligns with one edge of the first conductive film, and the gap is configured to be symmetrical with respect to a middle of the edge of the ring-shaped conductive film;

wherein the ring-shaped conductive films corresponding to the second conductive film are connected with each other, and the first conductive film and the gaps are arranged in a matrix.

7. The liquid crystal device as claimed in claim 6, wherein the first conductive film and the second conductive film are transparent conductive films.

8. The liquid crystal device as claimed in claim 7, wherein the first conductive film and the second conductive film are transparent ITO films.

9. The liquid crystal device as claimed in claim 6, wherein the TFT substrate and the CF substrate are coated with alignment films made by polymer materials.

10. The liquid crystal device as claimed in claim 9, wherein the alignment film is made by polyamide amine.

* * * * *